United States Patent [19]

Porter

[11] 4,346,961
[45] Aug. 31, 1982

[54] FIBER OPTIC T COUPLER

[75] Inventor: David R. Porter, Seattle, Wash.

[73] Assignee: The Boeing Company, Seattle, Wash.

[21] Appl. No.: 26,373

[22] Filed: Apr. 2, 1979

[51] Int. Cl.³ .............................................. G02B 7/26
[52] U.S. Cl. .................................. 350/96.16; 350/96.15
[58] Field of Search .............. 350/96.15, 96.16, 96.20, 350/96.21, 96.22

[56] References Cited

U.S. PATENT DOCUMENTS

| | | | |
|---|---|---|---|
| 3,589,795 | 6/1971 | Miyazaki et al. | 350/96.15 X |
| 3,901,582 | 8/1975 | Milton | 350/96.16 |
| 3,902,786 | 9/1975 | Brown | 350/96.16 |
| 3,937,560 | 2/1976 | Milton | 350/96.16 |
| 4,072,399 | 2/1978 | Love | 350/96.16 |
| 4,092,061 | 5/1978 | Stigliani, Jr. | 350/96.15 |
| 4,112,293 | 9/1978 | Käch | 350/96.16 X |
| 4,149,770 | 4/1979 | Milton et al. | 350/96.15 |
| 4,173,390 | 11/1979 | Käch | 350/96.16 |

FOREIGN PATENT DOCUMENTS 484668  9/1976  Australia .......................... 350/96.15

OTHER PUBLICATIONS

Taylor et al., "Data Busing With Fiber Optics," *Naval Research Reviews*, vol. 28, No. 2, Feb. 1975, pp. 12-25.
Milton et al., "Optical Access Couplers And . . . ," *Applied Optics*, vol. 15, No. 1, Jan. 1976, pp. 244-252.

*Primary Examiner*—John D. Lee
*Attorney, Agent, or Firm*—Conrad O. Gardner; B. A. Donahue

[57] ABSTRACT

Symmetrical and asymmetrical T couplers utilizing a notched fiber. A mirrored surface applied to the sides of the notch and a perpendicularly disposed second fiber provide power division from one of the three ports of the T coupler to the remaining two ports without bifurcations.

1 Claim, 13 Drawing Figures

FIBER OPTIC T COUPLER

This invention relates to fiber optics communications systems and more particularly to multiport couplers utilized in fiber optics communications systems.

Fiber optic cables have characteristics such as large signal bandwidth, immunity to EMI and lighting effects, freedom from disabling short circuits and intermittent connectors, electrical isolation of interconnected systems, and light weight which can provide improved communications systems. However, for communications systems utilizing fiber optic cables to achieve widespread acceptance and application, simple and efficient coupler devices such as T couplers are required for interconnecting system elements. A T coupler is a three port device utilized in systems where a signal is coupled from a single path to two paths. Prior optical T couplers have utilized bundles of fibers and signal division was accomplished by a physical splitting of the bundle (bifurcation). However a trend toward utilization of single fiber cables does not make readily applicable the prior approach to bifurcation.

Accordingly, it is an object of this invention to provide a three port device for dividing optical signals entering one of the ports between the other two without bifurcation.

It is another object of this invention to provide a symmetrical T coupler wherein an input signal is divided equally into two output paths.

It is yet another object of this invention to provide an asymmetrical T coupler wherein an input signal is divided unequally into two output paths.

It is a further object of this invention to provide four, five, and six terminal data bus coupling without bifurcation.

It is still another object of this invention to provide a method of dynamic assembly of T couplers.

It is yet a further object of this invention to provide means including a mirrored notched fiber for optical signal division in a T coupler.

The above and other objects of the present invention are achieved in accordance with a preferred embodiment wherein a mirrored surface is applied to the sides of a notch of a first optical fiber whereby light may be coupled from either direction to a second fiber disposed perpendicular to the first fiber with central axis passing through the bottom of the notch and symmetrical and asymmetrical characteristics are determined by depth of the notch.

Further features and advantages of the invention will be apparent from reference to the specification and drawings wherein.

Figure 1:
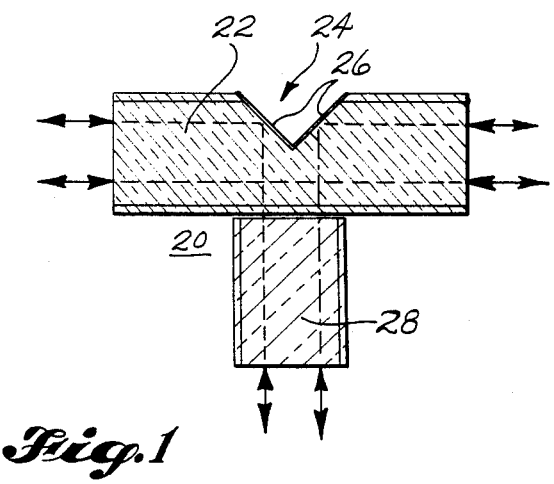
FIG. 1 is a side view in cross section of a first embodiment of a fiber optic T coupler in accordance with the present invention showing ray plots illustrative of the bilateral nature of the coupler provided by the mirrored notch surface.

Turning now to FIG. 1 it will be observed that optical T coupler 20 is a three port device whose function is to divide an optical signal entering one of the ports between the other two optimally with a minimum signal loss. When the coupling coefficients between all ports are equal the coupler is a symmetrical T coupler. Symmetrical T couplers are used in a system where a signal is desired to be divided equally between two paths. However, when attempting to minimize the greatest loss between terminals in a T configured data bus, it is necessary to use T couplers which have larger coupling coefficients between the two ports connected to the bus and smaller coefficients between the terminal port and the other ports. T couplers having unequal coupling coefficients are denoted asymmetrical T couplers and the concepts disclosed in and discussed hereinafter with regard to the T coupler embodiment of FIGS. 1-5 are applicable to both symmetrical and asymmetrical T couplers hereinafter discussed.

T coupler 20 of FIG. 1 includes a first optical fiber 22 having a notch 24 cut in the side of fiber 22, notch 24 seen in FIG. 1 in a side view of fiber 22 as having a V-shaped cross section. Both side surfaces of V-shaped notch 24 are provided with mirrored surfaces 26 to couple light from either direction at both end ports of first optical fiber 22 (as represented by the bidirectional arrows at each end representative of rays) to second perpendicularly disposed optical fiber 28. The bilateral nature of optical T coupler 20 utilizing a single pair of optical fibers without bifurcations of bundles of fibers thus becomes apparent. First optical fiber 22 and second optical fiber 28 may be referenced hereinafter in more functionally or structurally descriptive terminology as notched or throughput fiber 22 and tap fiber 28 to facilitate reference thereto with less likelihood of confusion in the following discussion.

The efficiency of T coupler 20 is directly dependent upon the degree of collimation or numerical aperture (NA) of the light propagating in the fibers. If the light is highly collimated (NA≈0), then T coupler 20 is potentially very efficient. As the NA increases, the coupler becomes less efficient. Typical low loss optical fibers have an NA of about 0.25 corresponding to a maximum half-angle ($Sin^{-1}NA$) of 14.5 degrees and are deemed reasonably efficient for use in T coupler 20. Mirrored surfaces 26 provide the source of attenuation through notched fiber 22. The fraction of optical power intercepted by mirrored surfaces 26 is dependent upon the depth of notch 24 and is equal to the projected area of mirrored surfaces 26 normal to the central axis of notched fiber 22 divided by the core area of notched fiber 22. Virtually all of the light not intercepted by mirrored surfaces 26 continues to propagate in notched fiber 22 and therefore coupling efficiency through notched fiber 22 is very high. However, loss does occur in coupling from tap fiber 28 to notched fiber 22 and vice-versa. The sources of loss are diagrammatically illustrated in the ray plots of FIGS. 2-5. The rays plotted are propagating at 14.5 degrees and represent the limiting cases where loss is likely to occur. It is estimated that less than about 35 percent (1.9 db) of the light is lost in coupling between notched fiber 22 and tap fiber 28 when notch 24 having mirrored surfaces 26 extends half way through the cross section (to the central axis) of notched fiber 22. Since coupling through notched fiber 22 is virtually lossless and coupling between notched fiber 22 and tap fiber 28 is lossy, T coupler 20 does not exhibit symmetrical coupling coefficients when mirrored notch 24 extends exactly halfway through the cross section of notched fiber 22. However, if the bottom point of V-shaped notch 24 extends more than halfway through the cross section of notched fiber 22, attenuation through notched fiber 22 increases and the loss between notched fiber 22 and tap fiber 28 decreases. At a point of V-notch 24 depth more than halfway through the cross section of notched fiber 22, the coupling coefficients become equal (yielding the symmetrical T coupler case) and coupler inefficiency is minimized resulting in an inefficiency of T coupler 20 of possibly less than about 1.5 db.

Figure 2:
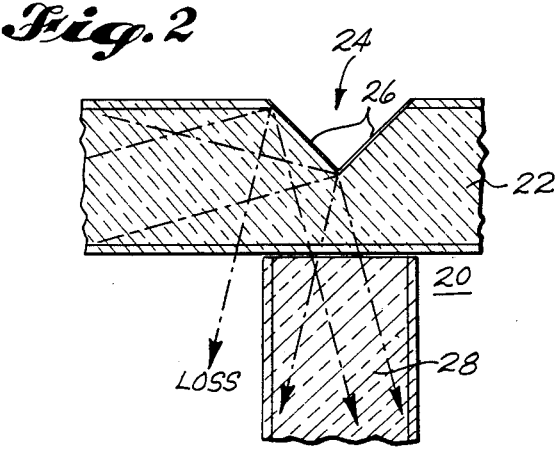
FIG. 2 is a diagrammatic side view of the fiber optic T coupler of FIG. 1 showing rays and the nature of the source of losses resulting from notched fiber to tap fiber coupling.
Figure 3:
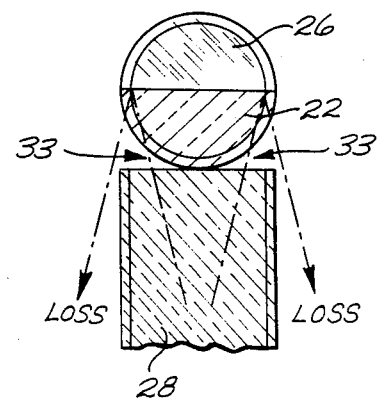
FIG. 3 is a diagrammatic end view of the mirrored notch of the fiber optic T coupler of FIG. 2 showing losses incurred.
Figure 4:
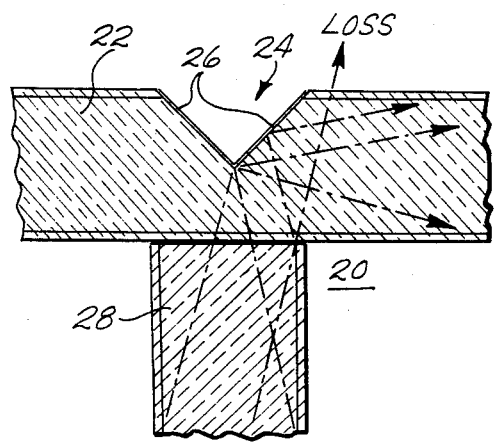
FIG. 4 is a diagrammatic view of the fiber optic T coupler of FIG. 1 illustrative of ray loss occurring in tab fiber to notched fiber coupling.
Figure 5:
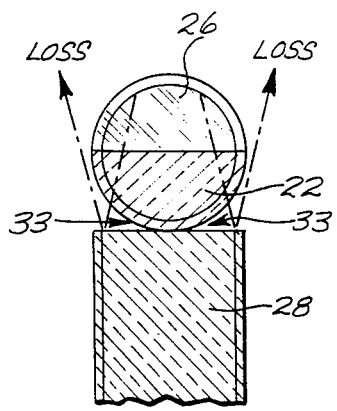
FIG. 5 is a diagrammatic end view of the mirrored notch of the fiber optic T coupler of FIG. 4 showing losses incurred.

Turning now to FIGS. 2 and 3 respectively side and end views of integrally formed 2 fiber T coupler 20 showing losses it should be noted that index matching epoxy with respect to notched fiber 22 and tap fiber 28 cores is provided in regions 33 (see end view of FIG. 3) between facing surface regions of notched fiber 22 and tap fiber 28. Ray plotting and losses in the limiting case as hereinbefore mentioned is seen in FIGS. 2 and 3 for notched fiber 22 to tap fiber 28 coupling, while the limiting case losses for tap fiber 28 to notched fiber 22 coupling is seen in FIG. 4 and in end view of FIG. 5.

While T coupler 20 of FIGS. 1-5 is shown to include a notch 24 having mirrored surfaces 26 polished therein, a further hereinafter described embodiment seen in FIG. 8 achieves substantially the same result where a mirrored wedge 44 is inserted into the notch. In the T coupler embodiment of FIG. 8, an index matching material (such as optical epoxy) having the same index of refraction as the fiber core is then disposed between the notch and the mirror to eliminate the effects of any surface irregularities arising from the grinding process.

Typical low loss optical fibers as hereinbefore mentioned which may be utilized in T coupler 20 have an NA of about 0.25. The efficiency at which light is coupled from notched fiber 22 to tap fiber 28 is directly dependent upon the NA of the fibers. For plastic clad fused silica fibers (such as shown in the T coupler of FIGS. 1-5) the numerical aperture as classically defined is 0.3 to 0.35 and mode stripping reduces this to a steady state numerical aperture of 0.2 to 0.24 for practical data bus lengths. This corresponds to about 13 degrees and for such small angles light loss is potentially small. Imbalance from loss which does occur can be compensated for by cutting notch 24 slightly deeper having the effect of increasing coupling from notched fiber 22 to perpendicularly disposed tap fiber 28 and decreasing coupling through notched fiber 22. As hereinbefore mentioned, equal division of light occurs between two receiver ports randomly chosen and T coupler 20 becomes symmetrical regardless of which of the three ports becomes the final transmitting port at a point for a notch 24 depth exceeding a radius of notched fiber 22. A radius depth or less for V-shaped notch 24 will provide an asymmetrical T coupler embodiment of the present invention having applications hereinafter described and shown in the systems of FIGS. 12 and 13.

Figure 6:
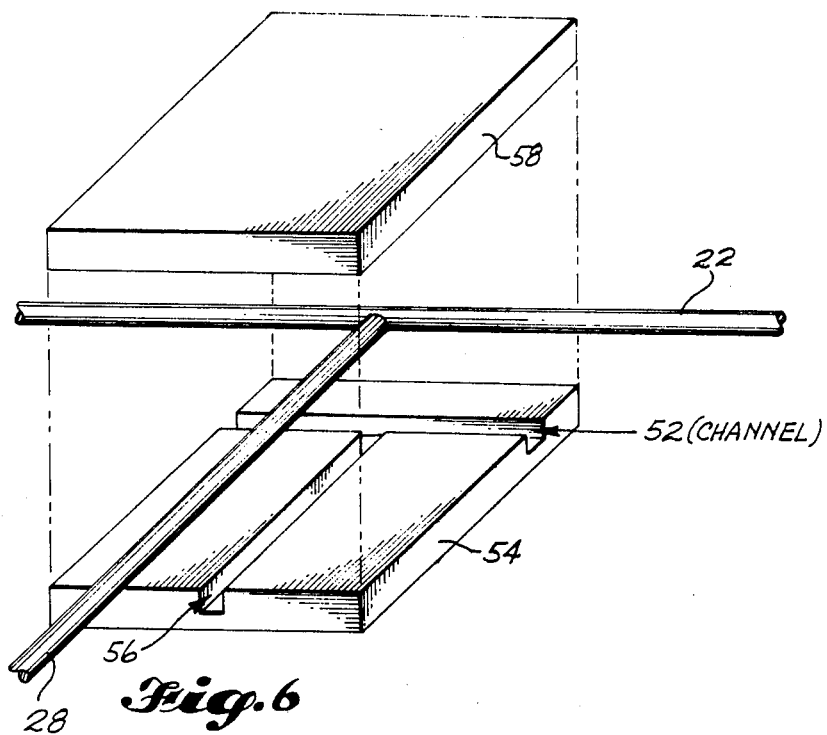
FIG. 6 is an exploded view illustrative of the pre-notch assembly apparatus and step in the method of making a fiber optic T coupler in accordance with an embodiment of the present invention.

Turning now to the method of making T coupler 20, and more particularly to the pre-notch assembly apparatus shown in the exploded view of FIG. 6 it can be observed that tap fiber 28 is first cut perpendicular to its axis, a step that can be accomplished by scribing and breaking. An optical epoxy having an index of refraction approximately equal to the core material of tap fiber 28 is placed in first channel 52 of positioning fixture 54 with fiber 22 (prior to notch cutting as done in FIG. 7) while tap fiber 28 is disposed in second channel 56. Pressure is applied to tap fiber 28 until contact is made with fiber 22.

Transparent plate 58 is disposed against positioning fixture 54 and pressure is applied thereto to sandwich and force tap fiber 28 and fiber 22 into a common plane and the optical epoxy subsequently used. First channel 52 and second channel 56 can be provided in positioning fixture 54 by conventional machining techniques or by masking and etching of crystalline or multilayer material. Channels 52 and 56 may be rectangular, V-shaped, or trapezoidal as long as fibers 22 and 28 are located in a common plane when pressure is applied to transparent plate 58.

Figure 7:
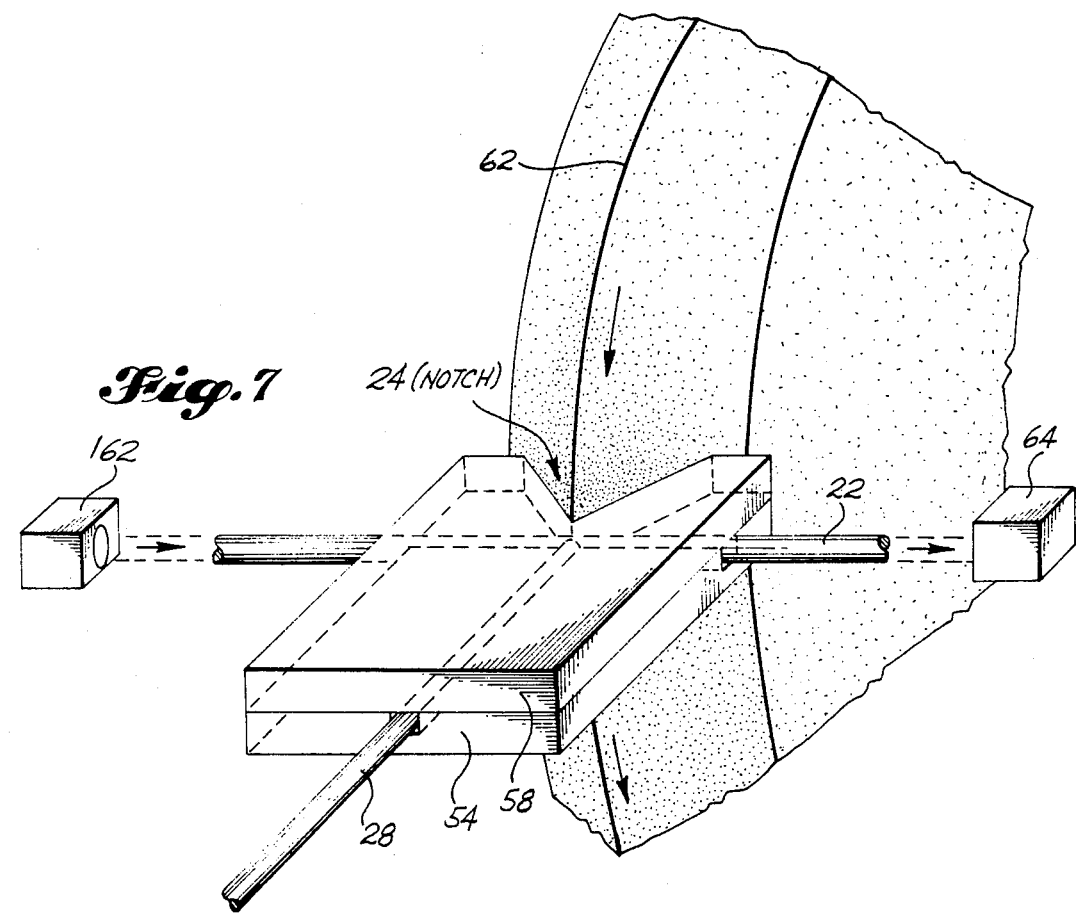
FIG. 7 is illustrative of the notching step utilized on the pre-notch assembly shown in FIG. 6 in the method of making a fiber optic T coupler in accordance with an embodiment of the present invention.

Cutting of notch 24 is then done as shown in FIG. 7 by a diamond or silicon wheel 60 having a cutting edge 62 which provides a 45 degree wide V-shaped notch 24 through the sandwich assembly including transparent plate 58 and positioning fixture 54. The diameter of wheel 60 should be substantially larger than the thickness of the sandwich assembly including plate 58 and positioning fixture 54 for ease in achieving desired results during notch 24 cutting. The sandwich assembly including transparent plate 58 and positioning fixture 54 sandwiching fibers 22 and 28 enables V-notch 24 alignment symmetrically about tap fiber 28 central axis by permitting observation of the cutting through transparent plate 58 and consequent visible adjustment for any offset that might occur. Notch 24 depth can be precisely controlled by monitoring the fraction of light coupled from light source 62 to detector 64 through fiber 22, the fraction of the initial optical power reaching detector 64 is equal to the fractional area of the core of fiber 22 not removed by cutting wheel 60 to the core area of fiber 22 prior to cutting. When power is reduced to one half the original value, notch 24 is one half fiber 22 diameter in depth.

Figure 8:
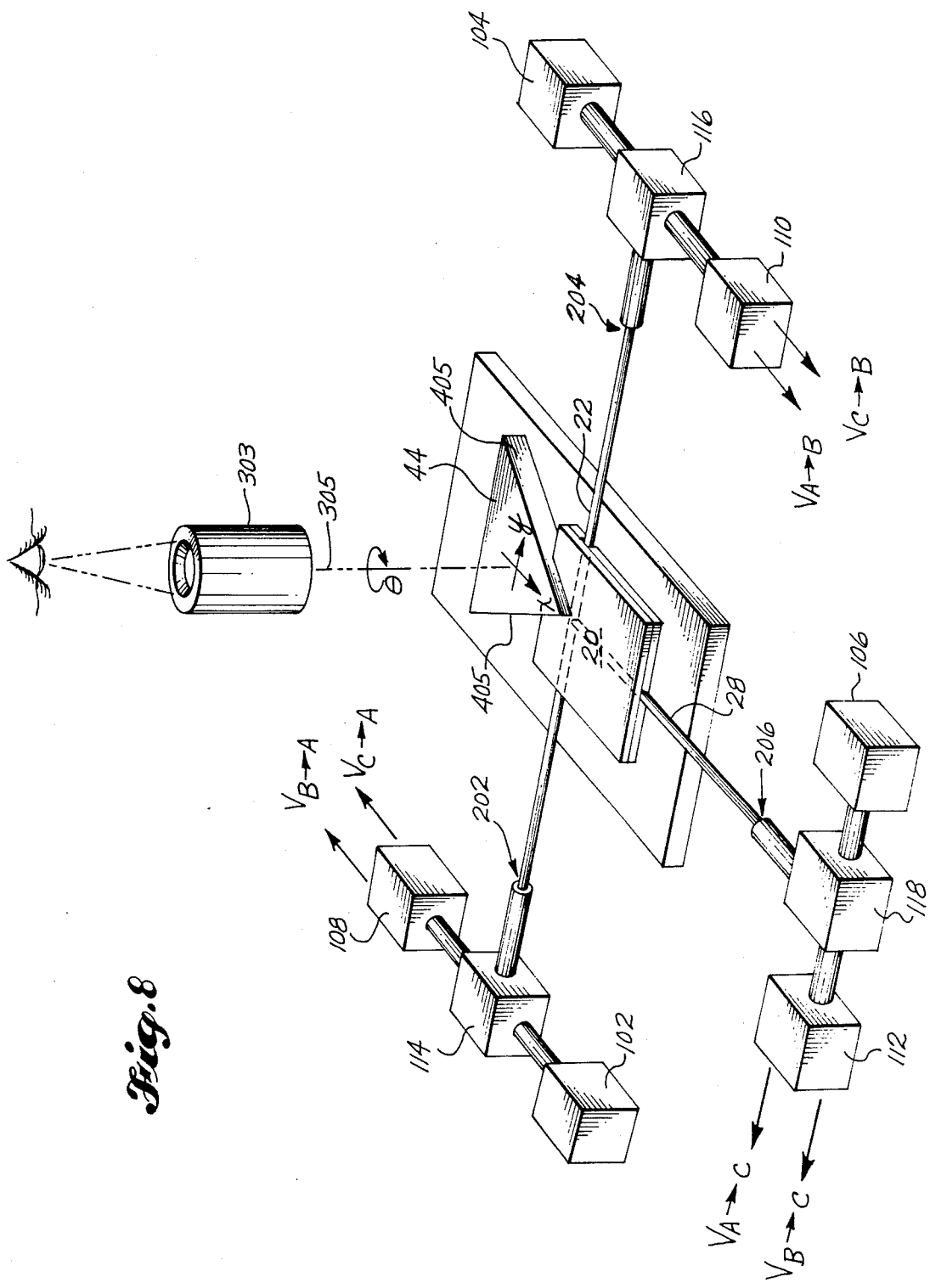
FIG. 8 is a schematic illustrative of apparatus and method for providing dynamic assembly of a fiber optic T coupler in accordance with an embodiment of the present invention which enables continuous monitoring of coupling coefficients between ports.

Final assembly apparatus is shown in FIG. 8, three light sources comprising first source 102, second source 104, and third source 106 are utilized. A first detector and receiver 108, a second detector and receiver 110, and a third detector and receiver 112 are also used. A first T coupler 114, a second T coupler 116, and a third T coupler 118 are further required. Dynamic assembly of T coupler 20, i.e., signal coupling through T coupler 20 can now be realized during assembly by continuous monitoring of coupling coefficients between ports. In calibration of the final assembly apparatus of the system of FIG. 8, an unnotched fiber is first connected between all combinations of first port 202, second port 204, and third port 206 and source 102, 104, and 106 amplitudes and receiver 108, 110, and 112 gains are adjusted to provide unity output levels. With the apparatus connected as shown in FIG. 8, receiver output voltages $V_{A \to B}$, $V_{A \to C}$, $V_{B \to A}$, $V_{B \to C}$, $V_{C \to A}$, and $V_{C \to B}$ are representative of the coupling coefficients between ports 202 and 204, 202 and 206, 204 and 202, 204 and 206, 206 and 202, and 206 and 204 respectively. In order to prevent interference between signals, time division, color division or modulation frequency division multiplexing is used. T couplers 114, 116, and 118 utilizing notched and tap fibers of larger diameter than the notched and tap fibers of T coupler 20 permit coupling losses at ports 202, 204, and 206 which are insensitive to small misalignment errors thereby providing better uniformity of results. Care should be taken in the selection of light sources 102, 104, and 106 with respect to radiation beam pattern since coupling coefficients between notched fiber 22 and tap fiber 28 are sensitive to the numerical aperture (NA).

As shown in the illustration of the system of FIG. 8, a microscope 303 is disposed along an axis 305 perpendicular to and above the plane containing mirrored wedge 44 and utilized to obtain lateral (y) and angular ($\theta$) alignment. Receiver 108, 110, and 112 voltage outputs are utilized to obtain the desired mirrored wedge surfaces 405 depth and consequent coupling coefficients, e.g. if $V_{A \to C}$ and $V_{B \to C}$ are less than the predetermined coupling coefficient value desired, then mirrored wedge 44 is moved in a positive x direction and if greater than the predetermined coupling coefficient value desired then in the negative x direction, an epoxy having an index of refraction about equal to that of fiber 22 and 28 cores being utilized to eliminate the irregularities in the notch surface and further provide for permanent retention of assembled T coupler 20.

Figures 9, 10:
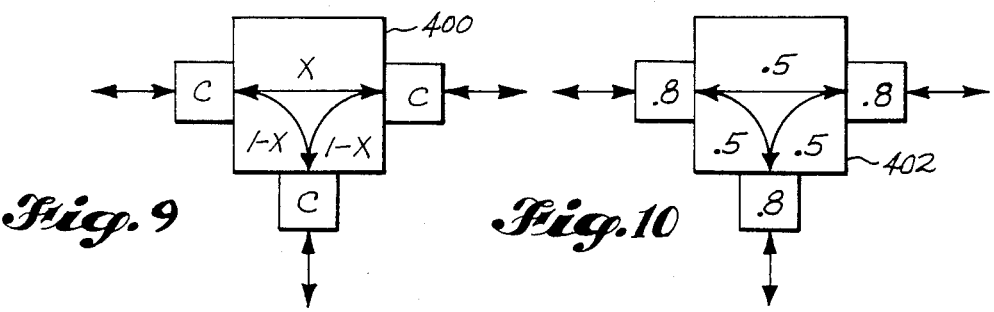
FIG. 9 is a schematic diagram of a T coupler model according to an embodiment of the present invention showing coupling coefficients.
FIG. 10 is illustrative of a three terminal data bus utilizing a symmetrical T coupler in accordance with an embodiment of the present invention.
Figure 11:
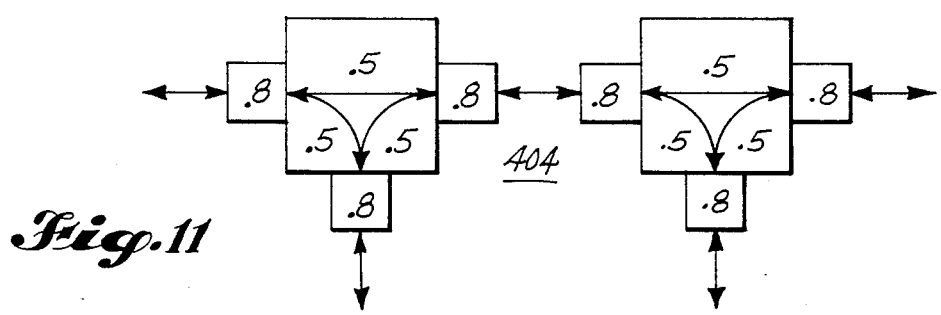
FIG. 11 is illustrative of a four terminal data bus utilizing first and second symmetrical T couplers in accordance with a further embodiment of the present invention.
Figure 12:
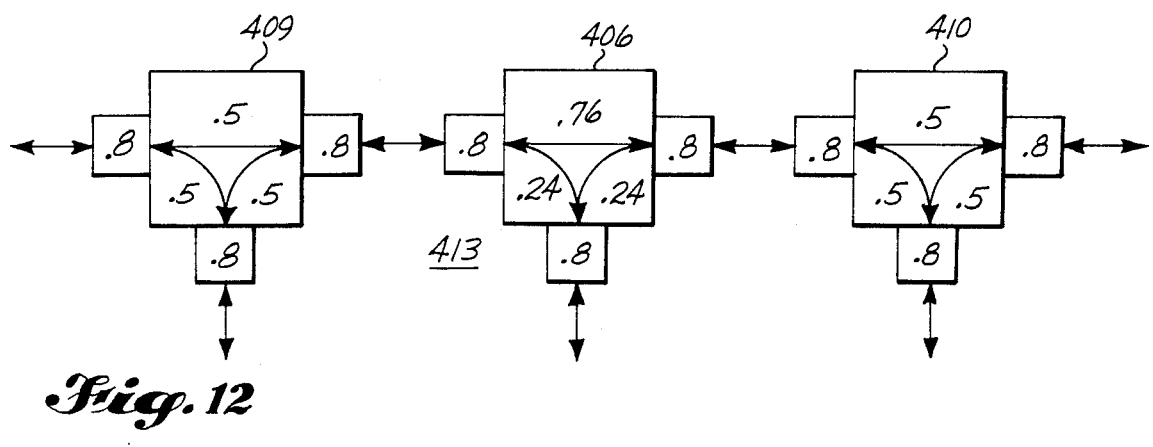
FIG. 12 is illustrative of a five terminal data bus utilizing first, second, and third asymmetrical T couplers in accordance with another embodiment of the present invention; and, FIG. 13 is a diagram illustrative of a six terminal data bus utilizing a first pair of symmetrical T couplers and a further pair of asymmetrical T couplers in accordance with yet another embodiment of the invention.
Figure 13:
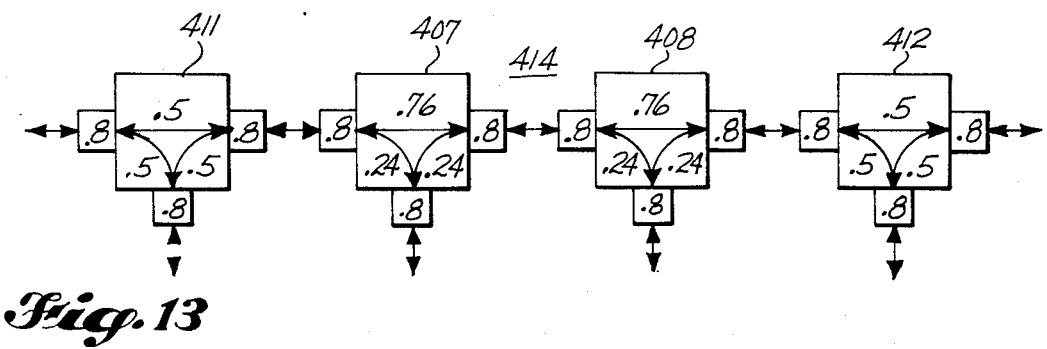

FIG. 9 is a simplified model 400 representative of T coupler 20 hereinbefore discussed wherein X is representative of the noted fiber coupling or throughput coupling coefficient, and 1-X is representative of the tap fiber coupling coefficient. From previous discussion it can be recollected that an asymmetrical T coupler is a three port device having the function of providing unequal coupling between the three ports. Unequal coupling is provided through adjustment of coupling coefficients by the method and apparatus of FIG. 8. Such asymmetrical coupling is utilized to improve overall systems performance in which the asymmetrical coupler is incorporated. If the T coupler 20 model of FIG. 9 is utilized in a T configured data bus and the coupling coefficients are optimized to minimize the maximum loss between ports, the advantage of asymmetrical T coupler versions of T coupler 20 can be readily appreciated. In the embodiments of T coupler 20 given in FIGS. 10-13, a 1 dB connector loss is assumed (where C=0.8). The optimization for a three terminal bus 402 (having a loss=5 dB where OSR=0 db) as in FIG. 10 or a four terminal bus 404 (having a loss=10 dB where OSR=5 dB) yields equal coupling coefficients (0.5) and symmetrical T couplers. However in more than 4 terminal data bus configurations utilizing a plurality of the present T couplers 20 as seen in FIGS. 12 and 13, it is advantageous to provide increased in-line coupling coefficients for couplers 406, 407 and 408 located intermediate the end couplers 409 and 410, and 411 and 412 respectively, viz those toward the center of the bus. For the five terminal data bus 413 of FIG. 12 (having a loss=13 dB and OSR=8 dB) and the six terminal data bus 414 of FIG. 13 (having a loss=16 dB and OSR=11 dB), the coupling coefficients for the couplers are 0.76 (in-line) and 0.24 (taps). A six terminal data bus so optimized (not shown) yields a maximum loss between terminals of 16.2 dB. If such a six terminal data bus were implemented using symmetrical T couplers the maximum loss is 19.8 dB. Therefore, the bus using asymmetrical T couplers yields a 3.6 dB lower loss, the improved T couplers 20 providing even greater improvements in loss reduction for greater numbers of terminals data bus configuration and as a consequence the aforementioned data bus embodiments are believed illustrative of the powerful tool provided the designer of data bus configuration by embodiments of the present invention symmetrical and asymmetrical T couplers 20.

What is claimed is:

1. A method of providing predetermined value of coupling coefficients in a fiber optic T coupler having a notched fiber comprising:

coupling first, second, and third source and receiver systems to the first, second, and third ports of said fiber optic T coupler having a notched fiber;

inserting a mirrored wedge in the notch of said notched fiber; and, adjusting the depth of insertion of said mirrored wedge as a function of receiver output voltages of said receiver systems to provide said predetermined value of coupling coefficients.

* * * * *